Aug. 8, 1972     T. J. BROWDER, JR     3,682,593
METHOD OF MANUFACTURE OF SULFUR DIOXIDE FROM SULFUROUS
MATERIALS CONTAINING NITROGEN COMPOUNDS
Filed Nov. 10, 1969
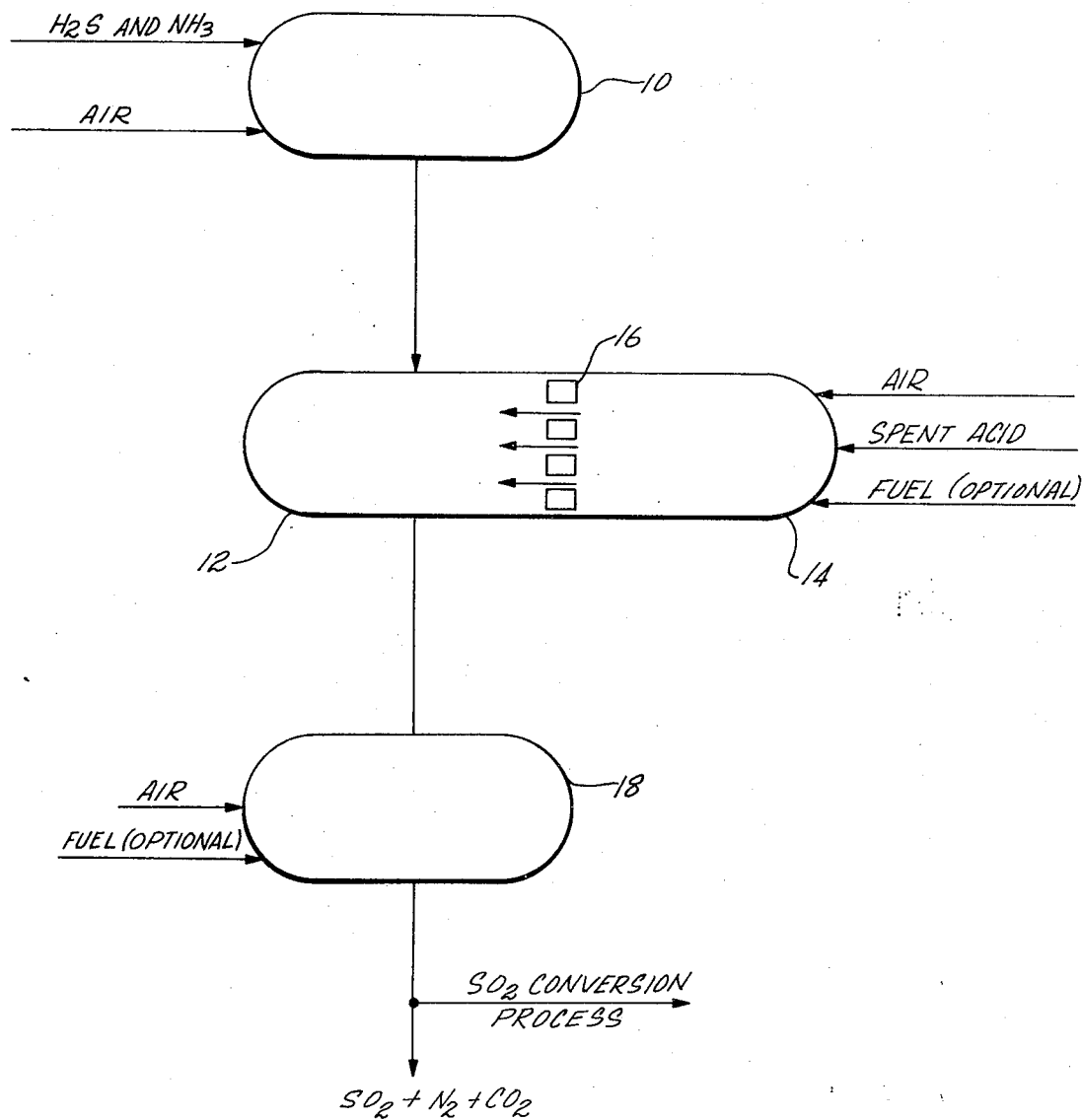
INVENTOR.
TIMOTHY J. BROWDER JR.
BY
Christie, Parker, & Hale
ATTORNEYS

United States Patent Office 3,682,593
Patented Aug. 8, 1972

3,682,593
METHOD OF MANUFACTURE OF SULFUR DIOXIDE FROM SULFUROUS MATERIALS CONTAINING NITROGEN COMPOUNDS
Timothy J. Browder, Jr., Los Alamitos, Calif., assignor to The Ralph M. Parsons Company, Los Angeles, Calif.
Filed Nov. 10, 1969, Ser. No. 875,270
Int. Cl. C01b *17/60, 17/56*
U.S. Cl. 423—523
14 Claims

ABSTRACT OF THE DISCLOSURE

Reducing the oxides of nitrogen formed during the oxidation of a source of sulfur which contains nitrogen compounds to inert nitrogen allows contaminant-free recovery of sulfur dioxide from the process gas stream or allows the process gas stream to be directly utilized for the production of contaminant-free derivatives of sulfur dioxide, such as sulfur trioxide, sulfuric acid, and the sulfates.

BACKGROUND OF THE INVENTION

The present invention relates to the production of sulfur dioxide from a sulfur source containing nitrogen compounds, and more particularly to reducing the nitrogen compounds to inert nitrogen to free the sulfur dioxide from contaminating nitrogen compounds.

Sulfur dioxide and its derivatives have long been manufactured from spent sulfuric acids, sour refinery gases and other sulfur bearing materials. Some sulfur-bearing gas streams, such as hydrogen sulfide containing gas streams, often contain ammonia and other nitrogen compounds. Heretofore such gas streams have not been employed in the production of sulfur dioxide and its derivatives because when burned independently or in conjunction with other sulfur feed materials to form the sulfur dioxide, the nitrogen compounds have been found to react to form products which cause corrosion, air pollution, as well as contamination of the desired end product or products.

SUMMARY OF THE INVENTION

It has now been found that sulfur dioxide may be obtained, free of contaminating nitrogen compounds from a sulfur source containing nitrogen compounds by oxidizing the nitrogen compounds to the oxides of nitrogen contemporaneously with converting the source of sulfur to sulfur dioxide, then reducing the oxides of nitrogen to inert nitrogen in the presence of a reducing agent.

The formed sulfur dioxide may be readily separated from the nitrogen and recovered as such or may be converted by conventional means to other sulfur compounds, such as sulfur trioxide, sulfuric acid and oleum without separating inert nitrogen which will pass unchanged through a processing system.

Ultimately reducing the nitrogen compounds present in the sulfur supply to inert nitrogen, eliminates both a source of contamination and the venting to the atmosphere of nitrous oxide compounds which are known pollutants.

DRAWING

The attached drawing is an illustration of a system for converting a source of sulfur containing nitrogen compounds to sulfur dioxide and inert nitrogen.

DESCRIPTION

According to the present invention, sulfur dioxide and its reaction derivatives may be manufactured free of contamination by nitrogen compounds from a source of sulfur which contains nitrogen compounds by oxidizing the contained nitrogen compounds to oxides of nitrogen, then reducing the oxides of nitrogen to inert nitrogen to form a gas stream from which sulfur dioxide may be readily recovered. Alternately, the gas stream can be passed to sulfur dioxide conversion systems where the formed inert nitrogen will pass through unchanged and the products formed will be free of nitrogen contamination.

With reference now to the drawing, a source of sulfur, such as a hydrogen sulfide gas stream containing nitrogen compounds such as ammonia, is oxidized in the presence of a source of oxygen, usually air, in incinerator 10 wherein the source of sulfur is typically converted to sulfur dioxide by reactions, such as in the instance of hydrogen sulfide:

$$2H_2S + 3O_2 \rightarrow 2H_2O + 2SO_2 \qquad (1)$$

Incineration temperature will normally be above about 900° F. and system operating pressures may vary widely although it will generally range from slightly below to slightly above atmospheric pressure. Although the illustrated reaction is typical, other oxidative reactions will occur depending on the composition of the source of sulfur. Some elemental sulfur may also be formed in the incinerator but will ultimately be consumed and converted to sulfur dioxide as a result of the addition of oxygen in the subsequent steps of the process of this invention.

Contemporaneous with the incineration of sulfur compounds, the nitrogen compounds in the gas stream are converted to oxides of nitrogen by reactions such as, among others:

$$4NH_3 + 5O_2 \rightarrow 4NO + 6H_2O \qquad (2)$$
$$2NO + O_2 \rightarrow 2NO_2 \qquad (3)$$

Following oxidation of nitrogen containing compounds to the oxides of nitrogen, the process gas stream is then passed through reduction zone 12 where the oxides of nitrogen and any remaining unconverted nitrogen compounds are reduced under reducing atmosphere conditions and in the presence of one or more reducing agents to inert nitrogen. Although not limited thereto, the typical reactions which occur in the reduction zone 12 are:

$$6NO + 4NH_3 \rightarrow 5N_2 + 6H_2O \qquad (4)$$
$$S + 2NO \rightarrow N_2 + SO_2 \qquad (5)$$
$$2C_2H_{(2n+x)} + 2(4n+x)NO \rightarrow (4n+x)N_2 + 2nCO_2 + 2(2n+x)H_2O \qquad (6)$$
$$2H_2S + 6NO \rightarrow 3N_2 + 2H_2O + 2SO_2 \qquad (7)$$
$$C + 2NO \rightarrow N_2 + CO_2 \qquad (8)$$
$$2CO + 2NO \rightarrow N_2 + 2CO_2 \qquad (9)$$

wherein for reaction (6) *n* represents the number of carbon atoms in hydrocarbon and *x* represents the degree of saturation.

The reducing agents used in the practice of this invention include the residual components from or formed in the oxidation stage, which serve as reducing agents for the oxides of nitrogen under reducing atmosphere conditions, such as sulfur and ammonia, as well as added reducing agents, such as carbonaceous materials.

Carbonaceous materials, typically crude hydrocarbons, may be conveniently conditioned for introduction to reducing zone 12 by partial consumption of part of the carbonaceous source in a deficiency of air in reducing zone 14, separated from zone 12 by a brick baffle wall 16. Reducing zone 14 is generally operated at a temperature of from about 1600° to about 2200° F. at or close to process operating pressures. There, partial reduction of a carbonaceous supply to carbon (soot) occurs which enters reducing zone 12 in mixture with any unconverted hydrocarbons.

Alternately, and more preferably, reducing agents are introduced to zone 12 by reducing another crude source of sulfur such as spent sulfuric acid, obtained for instance from an alkylation process. These spent acids generally contain suitable reducing agents, such as hydrocarbons, mercaptans and carbon in addition to sulfur. The spent acids may also be processed for use as reducing agents in reducing zone 14, where, for instance, spent sulfuric acid and its contained alkylation impurities are mainly converted to sulfur dioxide and sulfur trioxide by, among others, the reactions:

$$H_2SO_4 \rightarrow SO_3 + H_2O \qquad (10)$$

$$2H_2SO_4 \rightarrow 2SO_2 + O_2 + 2H_2O \qquad (11)$$

$$2H_2SO_4 \rightarrow 2H_2O + 2S + 3O_2 \qquad (12)$$

and where contained hydrocarbons will react according to the general expression:

$$4C_nH_{(2n+x)} + (6n+x)O_2 \rightarrow 4nCO_2 + 2\rightarrow(2n+x)H_2O \qquad (13)$$

wherein $n$ and $x$ are as defined above, at temperatures above about 1200° F., preferably from about 1600° to about 2200° F. under reducing atmosphere (deficiency of oxygen) conditions.

This provides a convenient way both to recover spent acids and gases from the sulfur dioxide consuming process and to provide thereby at least some or all of the reducing agents for the oxides of nitrogen. Hydrocarbons and sulfur compounds present will inevitably be converted to carbon dioxide and sulfur dioxide. In addition, the process gas stream may be beneficially enriched with sulfur to maximize sulfur dioxide production per pass.

The temperature at which reduction of the oxides of nitrogen to inert nitrogen ($N_2$) occurs in zone 12 will vary depending upon the source of the reducing agent supplied. Generally, however, it will be the average temperature realized by combining the streams from incinerator 10 and reducing zone 14.

After reducing the oxides of nitrogen to inert nitrogen, the gas stream is in condition for processing in any desired manner. Where a source of sulfur is, however, used to form the reducing agent for zone 12, it is preferred to further condition the gas stream to assure complete conversion of all sulfur compounds to sulfur dioxide. This is conveniently accomplished by passing the stream through another oxidizing zone 18 where any excess reducing agents and any unconverted sulfur compounds are oxidized in the presence of a source of oxygen, such as air, to sulfur dioxide and carbon dioxide, generally by reactions (1) and (13) above and where sulfur is consumed by the reaction:

$$S + O_2 \rightarrow SO_2 \qquad (14)$$

Oxidation in zone 18 may also be carried out with the addition of some fuel, but without material increase in temperature other than that provided by heat of reaction. This step is also valuable for oxidizing any remaining reducing agents.

When processing according to the practice of this invention, the gaseous stream leaving oxidizing zone 18 consists essentially of sulfur dioxide, carbon dioxide, water, inert nitrogen and some oxygen and is in condition for recovery or conversion of sulfur dioxide free of nitrogen contamination.

Recovery of sulfur dioxide may be by any conventional means such as cooling the gas stream, as in waste heat boiler, followed by purifying and drying the process gas stream then extracting the sulfur dioxide from the gas stream. This may be accomplished by any conventional means, such as absorption, using any absorbing agent, such as the ethanolamines and ammonia, sulfite solutions which selectively absorb sulfur dioxide. The remaining gaseous components including the inert nitrogen will pass through the absorber to the atmosphere. The absorbed sulfur dioxide is then stripped from the absorbent such as by the addition of $H_2SO_4$ to an ammonia bisulfate absorbent and recovered as gaseous sulfur dioxide or cooled and liquified.

The gas stream may also be used to form other derivatives of sulfur dioxide with or without removal of the inert nitrogen. Sulfur trioxide, for instance, may be produced by the reaction:

$$2SO_2 + O_2 \rightarrow 2SO_3 \qquad (15)$$

generally using a catalyst, such as vanadium pentoxide, and secondary oxygen or diluted air as the oxidizer.

Sulfur trioxide, thus formed, may then be recovered as such or converted to sulfuric acid or other sulfates by conventional processing measures.

Sulfuric acid is a particularly desirable end product from the sulfur dioxide gas stream. When it is, the gas stream, after conversion of sulfur dioxide to sulfur trioxide, is passed through an absorber where sulfur trioxide is absorbed by sulfuric acid, preferably a strong sulfuric acid, in the presence of water to form additional sulfuric acid. The nitrogen compounds, having been previously converted to inert nitrogen, pass through this system without change.

In addition to providing a route to the formation of valuable sulfuric compounds from a sulfur source containing nitrogen compounds, the process of the present invention reduces corrosion and potential contamination of the desired end product from such nitrogen compounds as $HNO_3$, $NO_2$ and the like. Of equal importance, however, is that venting of inert nitrogen to the atmosphere, instead of oxides of nitrogen, considerably reduces the possibility of air pollution, since the oxides of nitrogen are generally regarded as part of the pollutants present in smog.

What is claimed is:

1. A process for the conversion of a source of sulfur which also contains nitrogen compounds to sulfur dioxide which comprises:
    (a) oxidizing a gaseous stream containing the source of sulfur and the nitrogen compounds in the presence of a source of oxygen at a temperature sufficient to convert said source of sulfur to at least sulfur dioxide and said nitrogen compounds to at least the oxides of nitrogen which comprise predominantly nitric oxide; and
    (b) passing the oxidized gas stream through a reduction zone to reduce said oxides of nitrogen to inert nitrogen in the presence of a sufficient amount of at least one reducing agent for said oxides of nitrogen at a temperature sufficient to reduce said oxides of nitrogen, to inert nitrogen.

2. A process as claimed in claim 1 in combination with the additional step of passing the reduced gas stream through at least one additional oxidizing zone to form additional sulfur dioxide.

3. A process as claimed in claim 1 in which the reducing agent is selected from the group consisting of sulfur and carbonaceous materials.

4. A process as claimed in claim 3 in which the carbonaceous materials comprise particulate carbon and hydrocarbons.

5. A process as claimed in claim 1 in which the reducing agent is provided by the addition of a gaseous stream obtained by the reduction of sulfuric acid.

6. A process as claimed in claim 2 in which the reducing agent is provided by the addition of a gaseous stream obtained by the reduction of sulfuric acid.

7. A process as claimed in claim 1 in which a gaseous stream containing the source of sulfur and nitrogen compounds is oxidized at a temperature in excess of about 900° F.

8. A process as claimed in claim 5 in which the sulfuric acid is reduced at a temperature in excess of about 1200° F.

9. A process as claimed in claim 6 in which the sulfuric acid is reduced at a temperature in excess of about 1200° F.

10. A process as claimed in claim 5 in which the sulfuric acid is reduced at a temperature of from about 1600° to about 2200°F.

11. A process as claimed in claim 6 in which the sulfuric acid is reduced at a temperature of from about 1600° to about 2200° F.

12. A process as claimed in claim 1 in combination with the step of converting the formed sulfur dioxide to sulfur trioxide.

13. A process as claimed in claim 12 in which sulfur dioxide is converted to sulfur trioxide in the presence of a source of oxygen and a vanadium pentoxide catalyst.

14. A process as claimed in claim 12 in combination with the step of absorbing said sulfur trioxide in sulfuric acid in the presence of water.

References Cited

UNITED STATES PATENTS

| | | | |
|---|---|---|---|
| 1,487,647 | 3/1924 | Fauser | 23—220 |
| 2,301,650 | 11/1942 | Titlestad | 23—177 |
| 2,391,328 | 12/1945 | Mohr | 23—178 |
| 2,673,141 | 3/1954 | Barman | 23—220 |
| 2,910,343 | 10/1959 | Childers et al. | 23—2 |
| 3,125,408 | 3/1964 | Childers et al. | 23—2 |

FOREIGN PATENTS

| | | | |
|---|---|---|---|
| 1,055,571 | 1/1967 | England | 23—2 |

OSCAR R. VERTIZ, Primary Examiner

C. B. RODMAN, Assistant Examiner

U.S. Cl. X.R.

423—243, 538